(12) United States Patent
Macias et al.

(10) Patent No.: US 7,502,830 B1
(45) Date of Patent: Mar. 10, 2009

(54) SYSTEM AND METHOD FOR SETTING TWO-WAY ALERT NOTIFICATIONS IN AN INSTANT MESSAGING SYSTEM

(75) Inventors: Mike V. Macias, Round Rock, TX (US); Sandip Dnyaneshwar Mahajan, Nagpur (IN); Salil Pradeep Gandhi, Pune (IN); Saidas Tukaram Kottawar, Hingoli (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/045,367

(22) Filed: Mar. 10, 2008

(51) Int. Cl.
*G06F 15/16* (2006.01)
*G06F 15/173* (2006.01)

(52) U.S. Cl. .................. 709/206; 709/223; 709/228
(58) Field of Classification Search ......... 709/204–207, 709/217–219, 223–229
See application file for complete search history.

(56) References Cited

U.S. PATENT DOCUMENTS

| | | | |
|---|---|---|---|
| 7,263,545 B2 | 8/2007 | Digate et al. | |
| 2004/0189698 A1 | 9/2004 | Bokish | |
| 2005/0187781 A1 | 8/2005 | Christensen | |
| 2006/0142030 A1* | 6/2006 | Coskun et al. | 455/466 |
| 2006/0167849 A1 | 7/2006 | Marcus et al. | |
| 2007/0130256 A1 | 6/2007 | Moore et al. | |
| 2007/0162552 A1 | 7/2007 | Shaffer et al. | |
| 2008/0052377 A1* | 2/2008 | Light | 709/218 |
| 2008/0209347 A1* | 8/2008 | Malik et al. | 715/758 |

* cited by examiner

*Primary Examiner*—Joseph E Avellino
(74) *Attorney, Agent, or Firm*—MaxvalueIP, LLC

(57) ABSTRACT

One example of this system provides the ability to setup a two-way alert notification within an IM system. All parties can negotiate on how they set up the alert and what to do when it sets off. One of the approaches presented in this invention is to modify the basic functionality of existing alert notifications, in such a way that it allows the targeted remote user to become aware that an alert has been set to report the change in his/her availability status, and enables this remote user to respond. A popup message on the targeted user's side notifies the user of this alert event.

1 Claim, 4 Drawing Sheets

SYSTEM AND METHOD FOR SETTING TWO-WAY ALERT NOTIFICATIONS IN AN INSTANT MESSAGING SYSTEM

BACKGROUND OF THE INVENTION

Instant messaging (IM) applications are one of the fastest growing modern-age communication tools. Instant messaging, previously used for entertainment purposes, is steadily propagating onto everyday lives of people and is becoming a seriously efficient form of communication for businesses. The real-time nature of this tool, and its capability of maintaining the lists of all contacts along with their availability statuses organized in categories, have made it an attractive choice to be used for internal as well as external transactions and communications of corporations. The recording of all or some of the conversation by IM is easy, its archival requires not much of memory space, and it paves the way for mounting other accessibility features such as text-to-speech and speech-to-text applications. Making use of such applications also facilitates the conversion of IM conversations to oral communications and vice versa in a customer service environment.

As noted above, Instant Messaging systems provide many user alert features for example alerts for when a contact from the buddy list becomes "Available", "Unavailable", "Goes offline", etc. Being one of the most important features of IM messaging systems, this feature has some shortcomings. For example, all of the notifications for these alerts are sent to the person setting the alerts. The targeted users, whose availability statuses are being checked by the alerting system, are not aware that such alerts are being set on their behalf. Sometimes, it would be useful to alert the user for whom the alert is set, especially if the alert is being set for "Log off" or "Goes offline." Currently, the targeted user might forget about an important IM session before leaving the IM system. This problem is solved with a two-way alert notification within the IM system.

SUMMARY OF THE INVENTION

One embodiment provides the ability to setup a two-way alert notification within an IM system. It provides the ability for the user for whom an alert is being set, to be notified of such event and to be provided with the ability to respond to the alerter (person setting up the alert). All parties can negotiate on how they set up the alert and what to do when it sets off. The solution approach presented in this invention is to modify the basic functionality of existing alert notifications, in such a way that it allows the targeted remote user to become aware that an alert has been set to report the change in his/her availability status, and enables this remote user to respond. A popup message on the targeted user's side notifies the user of this alert event.

DETAILED DESCRIPTION OF THE PREFERRED EMBODIMENTS

Some embodiments discussed in this section are in no way intended to limit the application of this invention. The solution approach presented in one of the embodiments of the invention is to modify the basic functionality of existing alert notifications, e.g. alerts for when a user becomes "Available", "Unavailable", "Goes offline", etc, in instant messaging systems in such a way that it allows the targeted remote user to become aware that an alert has been set to report the change in his/her availability status, and enables this remote user to respond. A popup message on the targeted user's side notifies the user of this alert event.

The followings are some examples of how this method works. Alert for when user becomes "Available" is set using existing set/trigger mechanism. A new input field is provided so that the user setting the alert can include a message (e.g., "Please meet us in conference room 1S-040 for the status meeting") that the targeted user can see, once the event is triggered.

At the same time when the user, who has set the event, is notified that the targeted user is available (e.g., has become online and is willing to chat), an instant message is automatically generated for the targeted user with whatever text was set when the event was setup ("Please meet us in conference room 1S-040 for the status meeting"). The two-way communication has now been triggered, and each user could continue the dialog, if desired.

Alert for when user becomes "Unavailable" is similarly set using existing set/trigger mechanism. An input field is provided so that the user setting the alert can include a message that the targeted user can see once the event is triggered. An alert is automatically set for the targeted user's IM session, with the text already provided as explained above. When the targeted user attempts to log off from its logged IM session, the event is triggered and the targeted user receives the text. A notification will automatically display on the targeted user's client with the alert text setup above (or any other text used, e.g., "Need to discuss 4Q/Sales data with you as soon as possible"). Targeted user now has the ability to start a two-way communication with the originator of the event. The two-way communication has now been triggered, and each user could continue the dialog, if desired.

Figure 1:
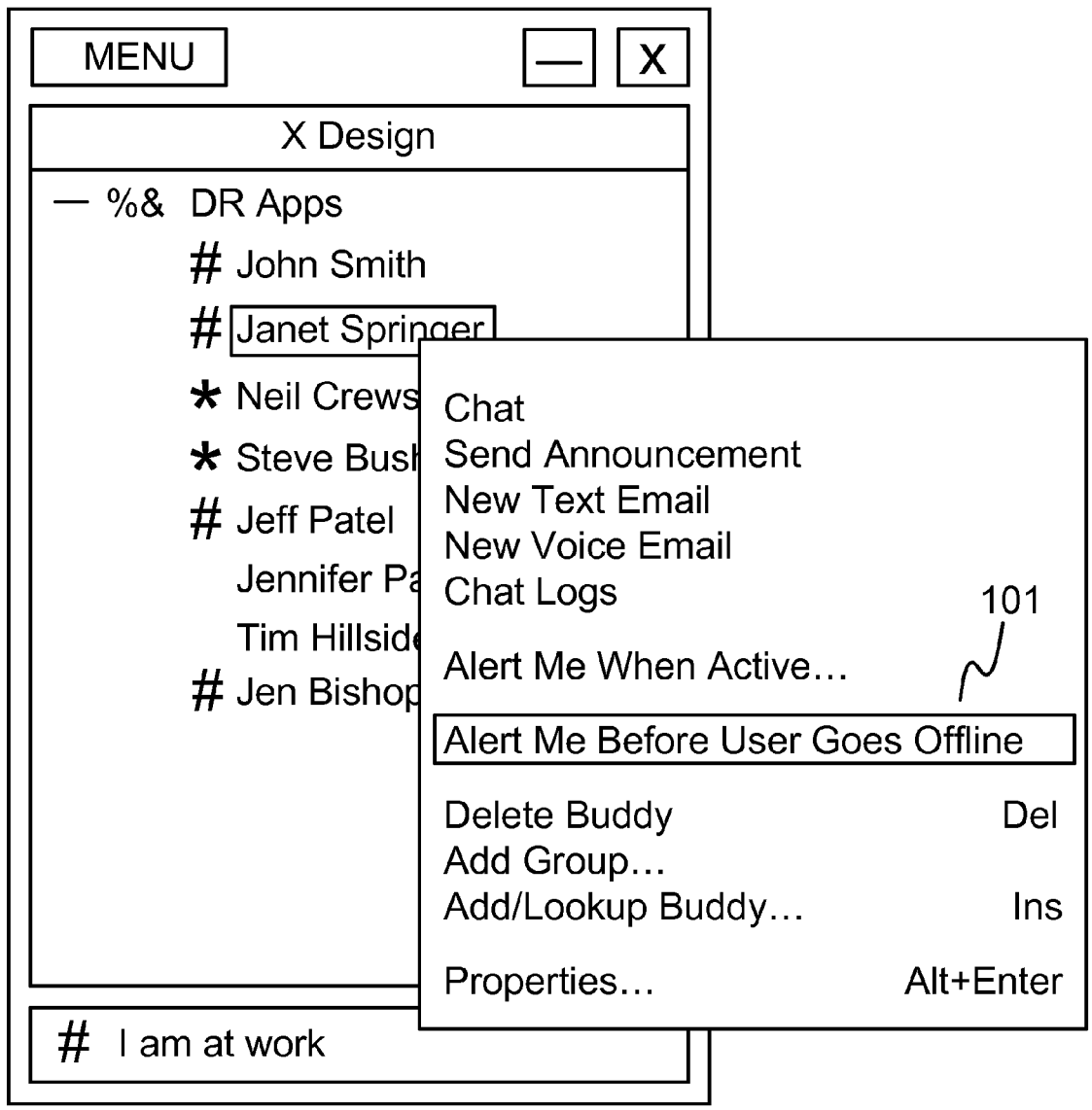
FIG. 1 is a diagram demonstrating the situation when the first user is setting the alert.
Figure 2:
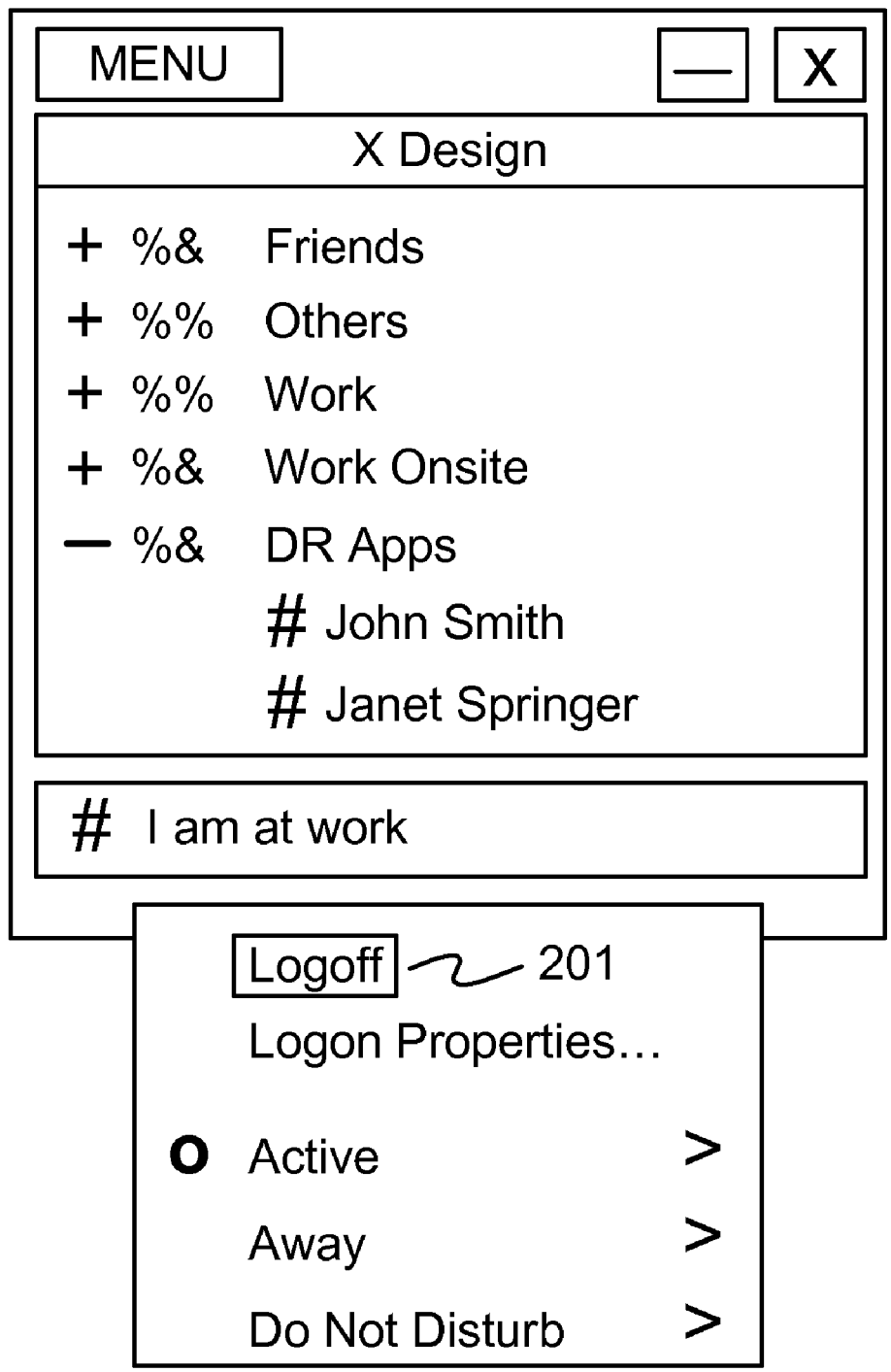
FIG. 2 shows the situation when the second user intends to logoff the chat session.
Figure 3:
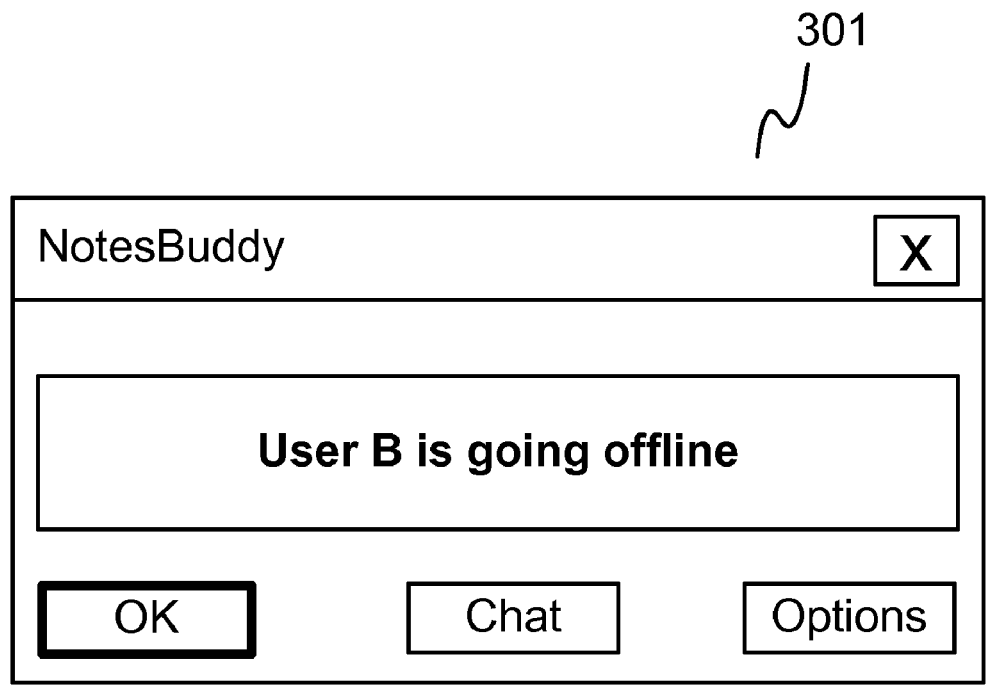
FIG. 3 illustrates how the system notifies the first user of the intention of the second user to logoff and end the chat session.
Figure 4:
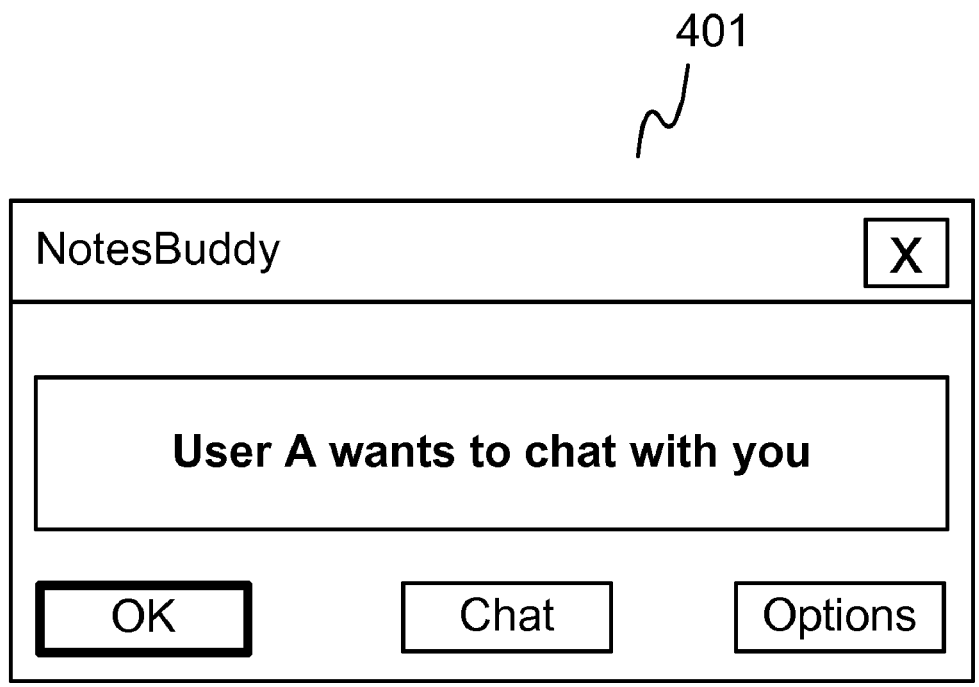
FIG. 4 illustrates how the system notifies the second user that the first user requests the start or continuation of a chat session before he/she logs off.

Alert for when user "Goes offline" is implemented in a similar fashion. Analogous to the "Unavailable" case above, the approach is demonstrated in the FIGS. 1-4 for the "Goes offline" scenario:

1. Two users instant messaging: User A and User B.
2. User A wants some important Information (e.g. weekly ticket status) from User B. But User B is too busy to chat with User A, so User A decides to chat with User B later. User A sets an "offline alert" (101) for User B as shown in FIG. 1.
3. After a later time, User B finishes his/her work and clicks on "log off" (201) option in IM client as shown in FIG. 2.
4. Once User B clicks on the "log off" option, a two-way alert is displayed on both User A and User B IM clients as follows:
    a. User A will get the alert (301) shown in FIG. 3.
    b. User B will get the alert (401) shown in FIG. 4.

The figures mentioned above show the usage of the default text for user B. In case user A has a specific message to be displayed at the alert event, a proper customized message can also be set up.

Therefore, in one embodiment of this invention, a method for setting two-way alert notifications in an instant messaging system is presented. The method comprises a first user sending an instant message to a second user; setting up a list of choices for user-interface for all possible alerting features determining whether a status of the second user is available, unavailable, offline, busy, interested, not-interested, or active.

All possible alerting features depend on the status of the second user. The first user sends the list of choices for user-interface for all possible alerting features to the second user. The second user negotiates with the first user on the list of choices for user-interface for all possible alerting features, by exchanging e-mails or instant messages, and editing or modifying the list of choices for user-interface for all possible alerting features.

The first user and the second user approve a final version of the list of choices for user-interface, applying the final version of the list of choices for user-interface to the instant messaging system. The final version of the list of choices for user-interface comprises a two-way alert notification. Upon occurrence of a triggering event, the user-interface sends a first alert notification to the first user (301) and a second alert notification to the second user (401). The second alert notification notifies the second user about the first alert notification to the first user.

The triggering event mentioned above comprises one or more of the following: initiating to turn-off the instant messaging system, turn off a computer system, launch a first application program, or terminate or halt a second application program.

A system, apparatus, or device comprising one of the following items is an example of the invention: two-way alert device, messaging service, meeting organizer, email server, server, client device, PDA, mobile device, cell phone, storage to store the messages, router, switches, network, communication media, cables, fiber optics, physical layer, buffer, nodes, packet switches, computer monitor, or any display device, applying the method mentioned above, for purpose of alerting, invitation, reminding, IM, or meeting management.

Any variations of the above teaching are also intended to be covered by this patent application.

The invention claimed is:

1. A method for setting two-way alert notifications in an instant messaging system, said method comprising:
   a first user sending an instant message to a second user;
   determining whether a status of said second user is available, unavailable, offline, busy, interested, not-interested, or active;
   said first user setting up a list of choices for user-interface for all possible alerting features;
   wherein said all possible alerting features depends on said status of said second user;
   said first user sending said list of choices for user-interface for all possible alerting features to said second user;
   said second user negotiating with said first user on said list of choices for user-interface for all possible alerting features, by exchanging e-mails or instant messages, and editing or modifying said list of choices for user-interface for all possible alerting features;
   said first user and said second user approving a final version of said list of choices for user-interface;
   applying said final version of said list of choices for user-interface to said instant messaging system;
   wherein said final version of said list of choices for user-interface comprising a two-way alert notification;
   upon occurrence of a triggering event, sending a first alert notification to said first user and sending a second alert notification to said second user;
   wherein said second alert notification notifying said second user about said first alert notification to said first user; and
   wherein said triggering event comprising one or more of the following: initiating to turn-off said instant messaging system, turn off a computer system, launch a first application program, or terminate or halt a second application program.

* * * * *